Dec. 13, 1949  F. H. M. J. MAILLARD ET AL  2,491,191
ROTATING-WING MACHINE
Filed May 15, 1945   3 Sheets-Sheet 1
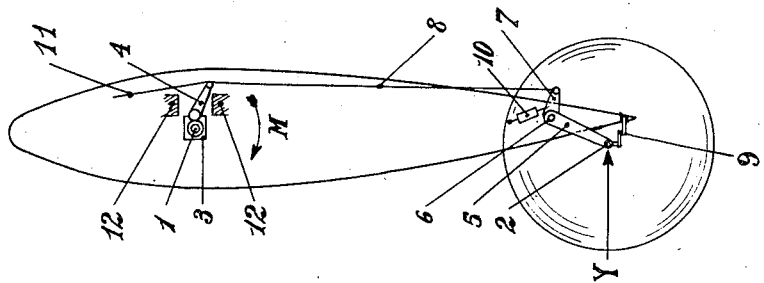
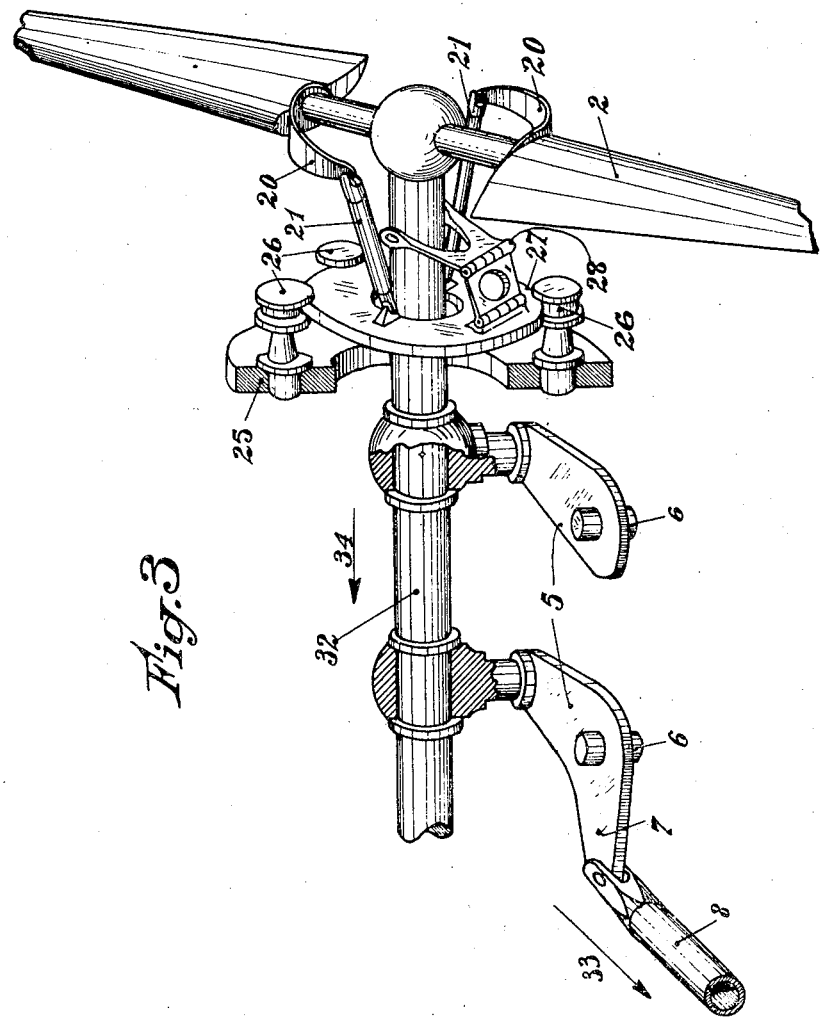
Francis H. M. J. Maillard,
André H. Laville & Jean A. Beziaud
By Fraser, Myers & Manley Atty's

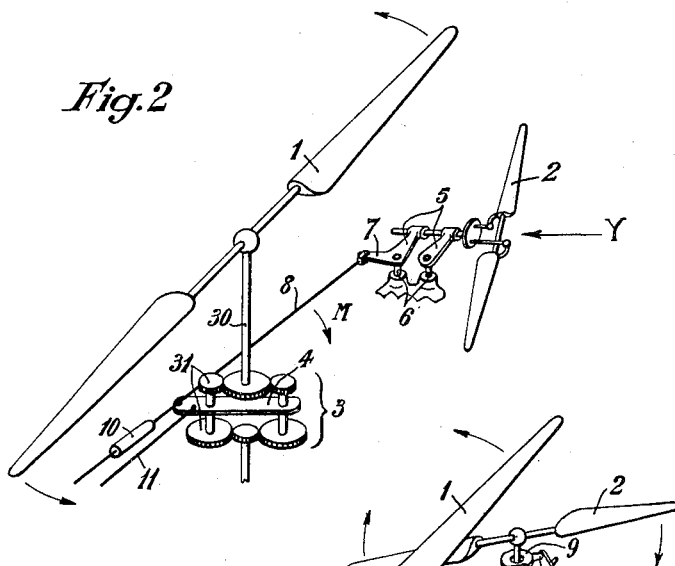
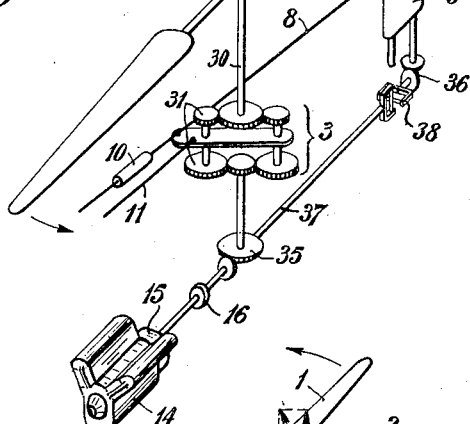
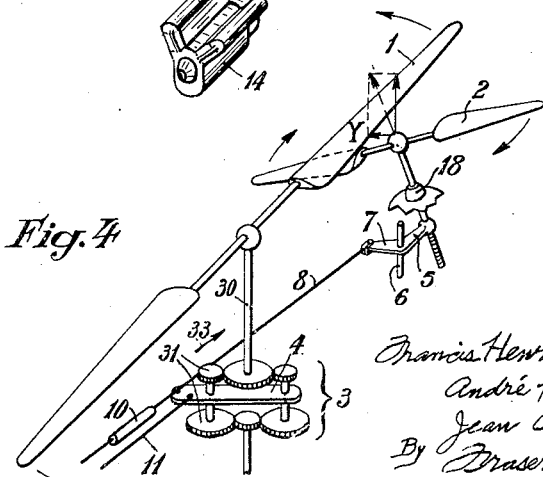

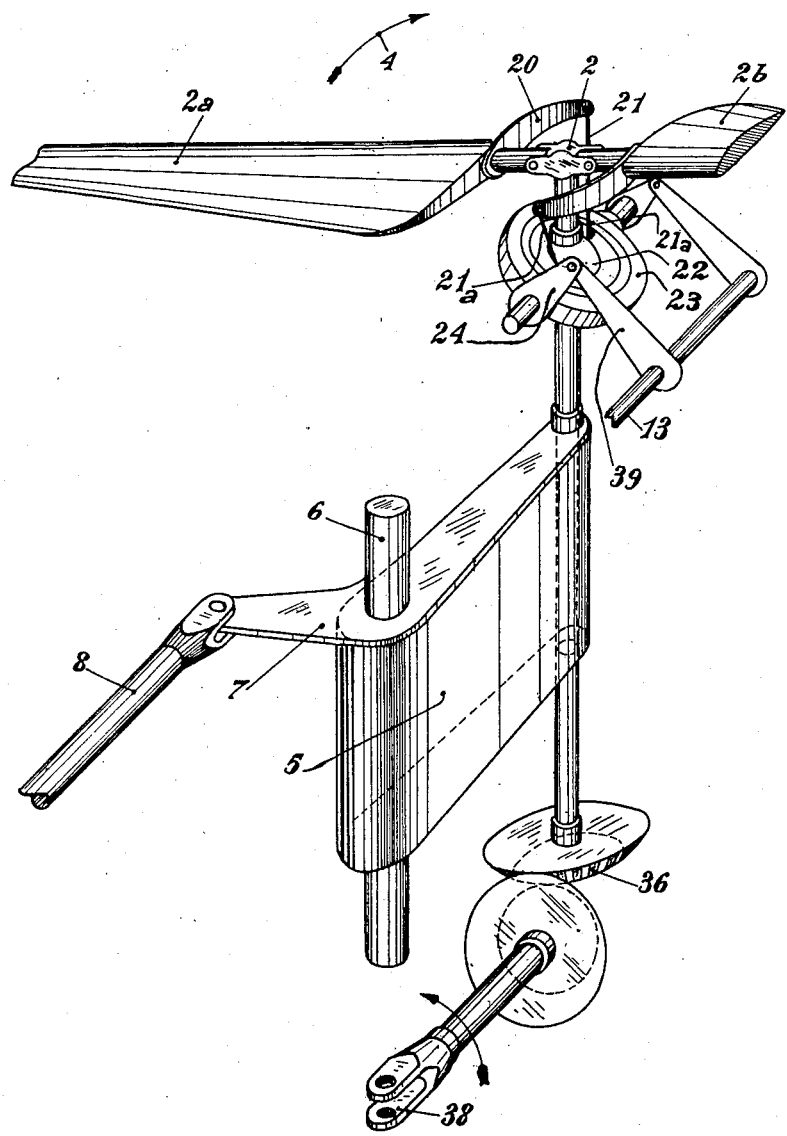

Patented Dec. 13, 1949

2,491,191

UNITED STATES PATENT OFFICE 2,491,191

ROTATING-WING MACHINE

Francis Henri Marie Joseph Maillard, Issy-les-Moulineaux, André Henri Laville, Fontenay-aux-Roses, and Jean Auguste Béziaud, Asnieres, France, assignors to Societe Nationale De Constructions Aeronautiques Du Sud-Ouest (Societe Anonyme), Paris, France, a company of France Application May 15, 1945, Serial No. 593,872
In France February 15, 1944

Section 1, Public Law 690, August 8, 1946
Patent expires February 15, 1964

7 Claims. (Cl. 170—135.22)

It is known that flying machines provided with rotating wings or lift propellers such as helicopters or gyroplanes require means for balancing the reaction torque developed in the machine frame by the rotating wing, and means to enable the pilot to steer the machine in flight.

Our invention relates to machines of the aforesaid type, more particularly to those which comprise a main rotor and a balancing rotor.

A primary object is to secure compensation for the reaction torque exerted by the main rotor on the machine frame, whatever the R. P. M. may be and without any manoeuvre by the pilot.

Another object it to enable the pilot to control the steering of the machine by acting on the reaction torque compensating means.

According to our invention, the balancing rotor is adjusted by or from a mechanism responsive to a difference between the main rotor torque and the reaction torque from the balancing rotor or to the difference of torques which are respectively proportional thereto. Hence, the adjustment is altered automatically until balance is reached.

For steering purposes, according to this invention, said balance is altered by acting in a direction or in the opposite direction on the member whose action depends upon the main rotor torque as transmitted to the balancing rotor.

To this end, a member which exerts a stress in proportion to the rotor torque (torque measuring means) is interposed in the transmission to the main rotor.

On the other hand, the axis of the balancing rotor instead of being stationary with respect to the machine frame is borne on a jointed support. Therefore, any transverse stress from said rotor tends to swing its support.

By suitably selecting the leverage in a transmission from the torque measuring means to the balancing rotor support, there is obtained a system which remains in equilibrium or balanced when the transverse stress from the rotor assumes a suitable value. Unless said value is reached, the support will move in response to the preponderating torque, driving therewith the balancing rotor. As the transverse stress from said balancing rotor is, according to our invention, controlled by the position of said rotor, the balancing rotor will move in response to the preponderating torque, until the stresses from the torque measuring means and the rotor are balanced, thereby altering its own adjustment until said rotor exerts the transverse stress which is exactly required to compensate for the main rotor torque.

This alteration of the transverse stress from the balancing rotor as a function of its position may be obtained for instance by a pitch altering control if the rotor has a transverse axis, by a cyclic alteration of pitch if the rotor has a vertical axis or by a variation of the axis inclination if the rotor has an inclined axis.

The device is preferably provided with abutments to limit the movements of the balancing rotor support and the torque measuring member, and with a damper or shock-absorber such as a dash pot (friction, pneumatic or hydraulic) mounted in the transmission to prevent the device from vibrating or reciprocating like a pump.

In order to steer the machine in flight, the steering control (pedals, bar, lever or hand wheel) is arranged to enable the pilot to exert an additional force on the torque measuring means. The automatic torque correction is thus disturbed and the machine turns in the desired direction.

The following description with reference to the appended drawing given solely by way of example will show how our invention may be carried out.

Fig. 1 is a diagram illustrating the principle of our invention.

Fig. 2 shows an example of construction in the instance of a balancing rotor with a transverse axis.

Fig. 3 shows a detail of Fig. 2, on a larger scale.

Fig. 4 shows another example of construction in the instance of a balancing rotor with a vertical axis.

Fig. 5 shows still another example of construction in the instance of a balancing rotor with an axis of alterable angle.

Fig. 6 gives further details of the embodiment shown on Fig. 5.

On the various figures homologous members are denoted by the same reference characters.

On Fig. 1 which is a diagrammatic plan view illustrating the principle of our invention the main rotor is not shown but its shaft is indicated at 1, while the shaft of the balancing rotor is denoted by 2. The rotation torque from the main rotor is transmitted by a so-called torque measuring means 3 of a known type, which is provided with a lever 4. The balancing rotor is mounted on a support 5 pivoted about axes 6, its steering being controlled by a lever 7. A rod 8 couples the lever 4 of the torque measuring member with lever 7. A jointed member 9 connected with the machine frame and the movable part of the balancing rotor controls the force displayed by said rotor by acting for instance, on the rotor blade incidence.

Finally the movable gear which supports balancing rotor shaft 2 is damped in its movements by a shock-absorber or damper 10 while the displacements of lever 4 are limited by abutments 12. Furthermore, owing to a steering control 11, the pilot is capable of acting on the device.

The foregoing mechanism operates as follows:

As a result of the rotary movement of the main rotor, the machine frame is subjected to a reaction torque tending to turn it in clockwise direction (arrow M); in order to oppose said reaction, the balancing rotor shaft 2 develops a transverse force Y which balances the force from torque M. As a matter of fact, owing to the torque measuring member 3, the lever 4 transmits to rod 8 displacements which are a function of the variations of main rotor torque; through lever 7, the displacements are transmitted to the rotor movable gear which consequently tends to move in a direction or the opposite direction, according as the reaction torque increases or decreases. During this movement the control device 9 acts, for instance on the incidence of the balancing rotor blades as more clearly set forth in the description of Figs. 3 and 6, in order to increase or diminish the force Y developed by the balancing rotor so that the reaction torque M is automatically compensated for and the system assumes its equilibrium position. Owing to damper 10, equilibrium is reached without oscillations. Finally, the control 11 enables of altering or disturbing this equilibrium by directly operating lever 7. Hence the machine is steered either by causing the reaction torque to become preponderating, or by increasing the transverse balancing stress Y. In the first case, the machine moves in the same direction as the reaction torque, while in the second case it turns in opposite direction. By the way, abutments 12 limit the extent of movements of the coupling device as well as the extent of movements of the steering control.

Fig. 2 illustrates an application of the principle to a balancing rotor having a horizontal axis. Rotary motion is imparted to the shaft 30 of main rotor shaft 1 through torque measuring means 3, comprising the lever 4 which carries reducing planet gears 31. Through rod 8 and lever 7, lever 4 is connected with the support 5 for the balancing rotor, support 5 being constructed as a jointed parallelogram. The control member 9 is a plate which controls the incidence of the blades of rotor 2. The arrangement for controlling balancing rotor 2 is illustrated on Fig. 3. Rod 8 is pivotally connected with lever 7 which is a part of the jointed parallelogram further including arms 5 mounted on pivots 6. The arms 5 carry the shaft 32 of the balancing rotor 2 which thus may be moved lengthwise. The member 9 already mentioned with reference to Fig. 1 is shown as a stationary plate 25 supporting rollers 26, in the grooved periphery of which a plate 27 is adapted to roll; plate 27 turns together with shaft 32, being coupled therewith through compasses 28. A pair of connecting rods 21 control the incidence of the blades of rotor 2 through levers 20.

When, for instance, the rotation speed of the main rotor or the incidence of its blades increase, the reaction torque M also tends to increase. The lever 4 of the torque measuring means tends to be moved in the direction of the motive torque, i. e. in a direction opposite to torque M. Rod 8 is thus moved in the direction of arrow 33, and rotor 2 in the direction of arrow 34. As plate 25 is stationary, rods 21 push levers 20 to increase the incidence of the blades of rotor 2, thereby tending to increase the force Y compensating the main rotor torque.

It should be understood that rotor 2 may rotate independently of the main rotor or may be coupled therewith either through a connection with bevel gears and Cardan joints, or a connection with chain and sprocket wheels or pulleys and belts.

Fig. 4 illustrates another manner of providing for automatic compensation. The balancing rotor has an oblique axis, the inclination of which may be varied; the axial thrust produced by said rotor thus includes a vertical component contributing in lift, and a horizontal component which is used for compensating for reaction torque. Rod 8, through lever 7, acts to vary the inclination of the shaft of rotor 2, slidable in a ball joint 18 and pivotally connected to arm 5 through another ball joint. Assuming that an increase of the reaction torque causes a movement of rod 8 in the direction of arrow 33, the movement results in increasing the inclination of the axis of rotor 2, and hence in increasing the balancing horizontal component Y.

Fig. 5 illustrates a device coupled with a balancing rotor, the horizontal blades of which are subjected to cyclic incidence variations. Both rotors are actuated from the machine engine 14 through a clutch 15 and a free-wheel 16. Transmission takes place through bevel gears 35 and 36, and in order to permit movements of the balancing rotor support 5 about axis 6, the shaft 37 between both bevel gears includes a Cardan joint 38. Both rotors are thus coupled as far as rotation thereof is concerned even when the engine is disconnected or free-wheel 16 is operative. Fig. 6 shows with more details the mounting of the balancing rotor 2 of Fig. 5. Said rotor is borne by support 5, which is swung about pivot 6 by rod 8 through lever 7. The pitch of the balancing rotor blades may be altered by means of a known mechanism, which moves the blades simultaneously or cyclically. It is advantageous in this respect to use a wobbling plate mechanism as illustrated by Fig. 6. The blade incidence depends upon the position of links 21, the ends 21a of which are caused to follow a guide in a circular plate 23, supported on a sliding ball 22. Plate 23 can swing on ball 22 when urged by levers 24, and it may be moved up and down upon rotation of control shaft 13 which actuates levers 24 through levers 39. When the reaction torque increases, support 5 swings thereby lessening the angle between levers 24 and 39 and increasing the inclination of plate 23. When the blades of rotor 2 are in a position at right angles to that shown on the drawing, blade 2a has turned by 90° for instance in the direction of arrow 40 and its incidence has diminished while the incidence of blade 2b has increased. The transverse reaction of the rotor will thus increase and the compensation for the main rotor reaction torque will also increase.

By turning shaft 13, the pilot may also cause plate 23 to move up or down and simultaneously alter the incidence of both rotor blades by the same amount, so as to alter the axial thrust of said rotor and, for instance, change the trim of the machine.

It is also possible to use a blade incidence control device such as shown on Fig. 3, by placing it in the proper direction and providing for inclination of plate 25.

The devices shown on Figs. 2, 4 and 5 include a damper 10 such as a dash pot adapted to brake any oscillations of the mechanism about its equilibrium position, and suitable abutment corresponding to abutments 12 shown on Fig. 1 but omitted here for the sake of clarity in the showing.

Finally the control member 11 is connected to the machine steering control, preferably through resilient means in order that any torque irregularities having a high frequency and set up by the engine (for instance cyclic irregularities corresponding to the member of cylinders, particularly in case of sparking failure) are not transmitted to said control member, as they would produce an unpleasant vibration of the handwheel or bar in direct contact with the pilot.

It should be understood that minor alterations may be brought about in the steering and compensating device above described without departing from the spirit of this invention.

What we claim is:

1. In a helicopter comprising a frame, a main rotor arranged approximately straight above the center of gravity of said helicopter, a balancing rotor, and power means provided in said frame to drive said rotors, the combination of torque measuring means arranged in the transmission between said power means and said main rotor comprising a lever adapted to be operated by a mechanical force proportional to the driving torque of the main rotor; oscillatable supporting means to hold the balancing rotor, stationary means to adjust the thrust of the balancing rotor, and a link connecting the end of said lever with said oscillatable supporting means and thereby to balance the thrust exerted on the oscillatable supporting means by the balancing rotor and consequently the yawing moment about the centre of gravity exerted by the balancing rotor with the force exerted by the driving torque of the main rotor.

2. A helicopter according to claim 1, in which the torque measuring means comprises two main sun gears respectively connected with the shaft of the power means and the shaft of the main rotor, and at least one couple of planetary gears, the shaft of said couple of planetaries being mounted on the lever which is adapted to receive and transmit a stress proportional to the driving torque of the main rotor.

3. A helicopter according to claim 1, in which the power means provided in the frame comprise an engine mounted on a shaft, said shaft being adapted to drive both said rotors, and comprising at least one universal joint bearing.

4. A helicopter according to claim 1, in which the power means provided in the frame comprise two engines respectively connected with the main rotor and the balancing rotor.

5. In a helicopter comprising a frame, a main rotor arranged approximately straight above the center of gravity of said helicopter, a balancing rotor having an horizontal shaft, and power means provided in said frame to drive said rotors, the combination of torque measuring means arranged in the transmission between said power means and said main rotor comprising a lever adapted to be operated by a mechanical force proportional to the driving torque of the main rotor; a second lever pivoted on said frame, a bearing pivoted on said second lever for said horizontal shaft, stationary means to adjust the pitch of the balancing rotor, and a link connecting an end of both said levers, and thereby to balance the thrust exerted on the lever pivoted on the frame by the balancing rotor and consequently the yawing moment about the centre of gravity exerted by the balancing rotor with the force exerted by the driving torque of the main rotor.

6. In a helicopter comprising a frame, a main rotor arranged approximately straight above the centre of gravity of said helicopter, a balancing rotor having a shaft adapted to revolve around a stationary point of the frame, and power means provided in said frame to drive said rotors, the combination of torque measuring means arranged in the transmission between said power means and said main rotor comprising a lever adapted to be operated by a mechanical force proportional to the driving torque of the main rotor; a stationary universal sliding joint bearing secured to said frame and adapted to support the shaft of the balancing rotor, and oscillatable means to support the end of said shaft comprising a lever pivoted on the frame adapted to hold a universal joint bearing; and a link connecting an end of both said levers, and thereby to balance the thrust exerted on the lever pivoted on the frame by the balancing rotor and consequently the yawing moment about the centre of gravity exerted by the balancing rotor with the force exerted by the driving torque of the main rotor.

7. In a helicopter comprising a frame, a main rotor arranged approximately straight above the centre of gravity of said helicopter, a balancing rotor having a vertical shaft, and power means provided in said frame to drive said rotors, the combination of torque measuring means arranged in the transmission between said power means and said main rotor comprising a lever adapted to be operated by a mechanical force proportional to the driving torque of the main rotor; a second lever pivoted on said frame, a bearing pivoted on said second lever for said vertical shaft, a disc supported on a sliding ball on said vertical shaft, stationary means to modify the position of said disc for adjusting the pitch of the balancing rotor; and a link connecting an end of both levers, and thereby to balance the thrust exerted on the lever pivoted on the frame by the balancing rotor and consequently the yawing moment about the centre of gravity exerted by the balancing rotor with the force exerted by the driving torque of the main rotor.

FRANCIS HENRI MARIE JOSEPH MAILLARD.
ANDRÉ HENRI LAVILLE.
JEAN AUGUSTE BÉZIAUD.

REFERENCES CITED

The following references are of record in the file of this patent:

UNITED STATES PATENTS

| Number | Name | Date |
| --- | --- | --- |
| 1,472,148 | Berliner | Oct. 30, 1923 |
| 1,993,701 | Avery | Mar. 5, 1935 |
| 2,317,340 | Bennett | Apr. 27, 1943 |
| 2,317,342 | Pullin | Apr. 27, 1943 |
| 2,318,259 | Sikorsky | May 4, 1943 |
| 2,327,370 | Pullin | Aug. 24, 1943 |
| 2,337,571 | Pullin | Dec. 28, 1943 |